Feb. 9, 1932. J. D. WOOD 1,844,112

TIME DELAYED OVERLOAD PROTECTIVE DEVICE AND METHOD

Filed March 15, 1927

Inventor,
Joseph D. Wood

Patented Feb. 9, 1932

1,844,112

UNITED STATES PATENT OFFICE

JOSEPH D. WOOD, OF WOLLASTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

TIME-DELAYED OVERLOAD-PROTECTIVE DEVICE AND METHOD

Application filed March 15, 1927. Serial No. 175,601.

This invention relates to time-delayed overload responsive devices for the protection of electrical apparatus such as motors, transformers, and the like.

A prime requisite for tripping devices for electric circuits is reliability of operation. For overload protection, the so-called instantaneous trip coil is accurate and reliable, as it commonly consists merely of a current coil energized by the circuit to be controlled, an armature disposed within the field of the coil, and a bridging member carried by the armature to close the circuit of the tripping coil. When an overload occurs of a predetermined magnitude, the field becomes sufficiently strong to raise the armature and suddenly close the tripping circuit. The absence of any variable element in the device accounts for its reliable and accurate operation. This device, however, fails to provide any time element of operation as the circuit is opened the instant that the predetermined overload occurs. For various well known reasons it is desirable to allow overloads to exist on the circuit for short periods rather than interrupt the circuit instantly, as many overloads are of short duration and of moderate value and, unless continued too long a period of time, are harmless.

In order to provide for an inverse time character of operation of the overload device, various arrangements have been proposed, as air or liquid filled dash pots, thermal devices, and the like all of which have some inherent characteristic that renders them objectionable and unreliable for one purpose or another.

It is an object of this invention to provide a time delayed overload responsive device for the control of an electric circuit which possesses the reliability and accuracy of the instantaneous trip coil.

In protective apparatus which may be applied to industrial equipment such as motors or circuit breakers, it is extremely important that servicing requirements shall be reduced to a minimum, since frequently after installation the equipment is given no further attention for long periods of time.

Consequently, it is an object of this invention to provide a time-delayed overload responsive device free from delicate mechanism such as delicate contacts and one which can be relied upon to operate indefinitely without adjustments or repairs.

A further object of the invention is the provision of a time delayed relay utilizing the current-speed characteristics of an electromotive device.

A further object of the invention is the provision of an overload responsive device which is shunted by a device having inductance, as an induction motor, having a movable element the movement of which acts to change the inductance of the device and therefore its shunting effect on the overload responsive device.

It is a further object generally to improve the construction and performance of overload protective devices.

Figure 1:
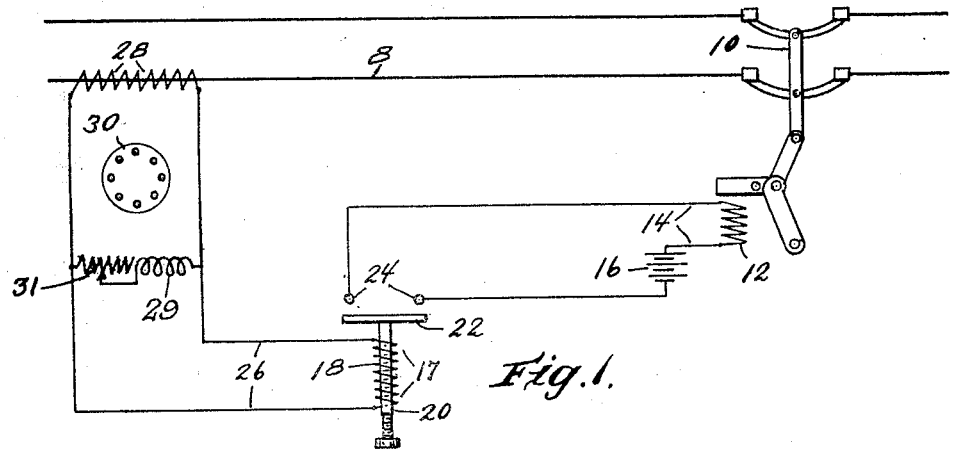
Fig. 1 shows a schematic diagram of a circuit controlled by an overload responsive device embodying the invention.

The protective apparatus embodying this invention is here shown as associated with a circuit 8 having a circuit breaker 10 therein which may be opened automatically upon the energization of the trip coil 12, which coil may be included in a circuit 14 which contains a battery 16 or other source of energy suitable for actuating the trip coil. Said circuit 14 is adapted to be controlled by a relay 17 comprising a part of this invention.

Said relay comprises a solenoid winding 18 having a core or plunger 20 operably disposed within the field of the winding to be moved upwardly when the winding is sufficiently energized, to move its bridging member 22 into electrical contact with the relay contacts 24 in the tripping circuit 14, thereby to close said circuit and effect the opening of the circuit 8. Said relay is preferably of the common instantaneous type and is adjustable to operate at various values of current in a well known manner. The relay is included in series in a circuit 26 with the secondary winding of a current transformer 28 for energizing it, and said transformer is adapted to be energized in proportion to the load in the circuit 8 to be protected.

In accordance with the invention, means is provided in the relay circuit 26 to effect a time-delayed operation of the instantaneous tripping relay 17 therein so that when the predetermined value of current is induced in the secondary of the transformer 28 which would normally raise the plunger 20, a suitable interval of time will elapse before the full value of the induced current is allowed to flow through the relay 17 and effect the tripping of the switch. Said means comprises essentially a motor 30 shunted across the terminals of the current transformer 28, or the relay 17, and adapted to be energized by the current flowing through the transformer 28.

The motor can be of any suitable type. When used in connection with a single phase alternating current circuit, as is here shown, the motor preferably is a small split-phase induction motor that preferably has a stationary energizing or stator winding and a squirrel-cage rotor and is self-starting when sufficiently energized. It can, however, be a commutator-type motor of the short-circuited brush type if the commutator and brushes are such as to have constant contact resistance for long periods of time, thus not to influence or vary promiscuously the operation of the relay. The characteristics of the motor are such that, for a normal load on the power circuit, the motor is stationary or does not rotate. The energizing of the motor is characterized by having a relatively low impedance compared with the solenoid winding of the relay and consequently, in effect, short circuits the winding, the main part of the current in the transformer-secondary flowing through the low-impedance motor winding.

When an overload of a value at which the relay 17 is adapted to operate occurs on the power circuit, the motor is adapted to begin to rotate, but will still divert so much of the current in the control circuit away from the relay as to hold the relay ineffective.

If the overload persists, the rotor of motor 30 gradually increases its speed, the rate of acceleration varying with the value of overload current. As the motor speed increases, the inductance and consequently the reactance of the winding is increased or a counter or reactive electro-motive force is set up in the motor winding which acts in opposition to the voltage impressed across the terminals thereof and this counter electro-motive force opposing the impressed voltage, or in the increased reactance, increases the impedance of the shunt circuit to the passage of current which is flowing in circuit 26. As a result, more and more current will be diverted from the shunt path through the winding 18 of the solenoid 17 as the motor accelerates; so that when the motor 30 reaches full speed the greater part of the current will pass through the solenoid winding 18.

The inductance and therefore the impedance of the motor winding is much greater when running at full speed than when at rest, so that a marked transfer of current between the motor and the relay takes place as the motor accelerates. After some time interval and when the speed of the motor has become sufficiently high, enough current will be diverted from the motor and pass through the relay to cause it to operate instantaneously, thereby to open the switch 10. The impedance of the motor winding can be varied by the variable resistor 31 in series therewith, whereby to vary the acceleration current characteristic of the motor and thereby vary the operation of the relay.

Means may be provided to apply a load, which can be varied, on the motor whereby the period of time-delay can be shortened or lengthened at will to meet varying conditions and requirements.

Figure 3:
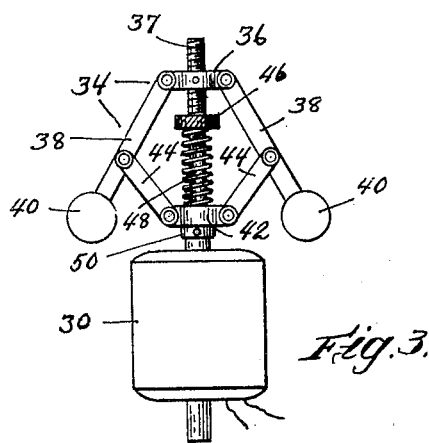
Fig. 3 is a detailed showing of the centrifugal loading device for the relay.

Said means comprises a centrifugal loading device 34 associated with the rotor of motor 30 which includes, as shown in Fig. 3, a collar 36 fixed to the motor shaft 37 and rotatable therewith, and a number of spaced arms 38 each pivotally connected to said collar at one end, and carrying a weight 40 at its other end. As the speed of the motor increases the arms are adapted to be thrown out in a well known manner to cause the weight to travel in a circle of increased radius. Adjustable means is provided for yieldingly restraining said arms from outward motion which means comprises a collar 42 freely slidable on the motor shaft and carrying a series of suitably spaced arms 44 pivoted at one end to arms 38 intermediate the ends thereof and at the other end to said collar 42. The motor shaft 37 is screw-threaded to a point somewhat below said collar 36 to receive a nut 46 which nut is adapted to be turned down on said shaft to compress a helical spring 48 which bears against the collar 42 and thereby restrains the arms 38 in their expanding movement which takes place upon rotation of the shaft. A fixed collar 50 may be placed on the motor shaft if desired to limit the movement of collar 42.

With the arrangement shown, the motor will start at some predetermined current value but will be slower in accelerating since more power is required to rotate the weights as they move outwardly, thus producing a slower rate of acceleration.

A device such as I have described may be employed to protect any desired apparatus, and is particularly well adapted to the protective requirements of electric motors since the overload protective relay for motors must be designed to allow the heavy starting current, of perhaps 600% of normal running value, to flow uninterrupted during the starting period, yet must function reliably to protect the motor against short circuits and moderate overloads of long duration. It is obvious that the relay embodying the present invention is particularly well adapted for this type of protection since it has similar operating characteristics to the motor to be protected, and by a simple adjustment of the tension spring 48 any reasonable time lag of operation can be obtained.

Figure 2:
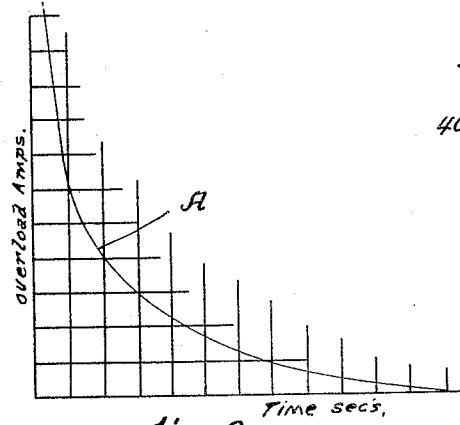
Fig. 2 is a diagrammatic representation of the operating characteristics of the device for various values of overload.

Fig. 2 illustrates the variety of operating curve to be expected of the above described apparatus. With high values of overload, the motor 30 comes up to speed rapidly so that the tripping relay quickly becomes sufficiently energized to operate. With small values of overload, the motor requires a relatively long time to get up speed and a considerable time period intervenes before the relay is sufficiently energized to operate. The operating curve A, therefore, is inverse.

The construction shown in this embodiment of the invention may be varied in many ways without departing from the scope of the invention.

I claim:

1. In an overload protective device for an electric circuit, the combination of a trip coil, a source of energy for said trip coil responsive to current conditions in the circuit, and an inductive shunt connected across the trip coil circuit comprising a variable impedance and an energizing winding of a rotary electro-motive device adapted to rotate upon overload in the circuit to vary the inductance of the shunt.

2. A time-delayed overload protective device for an electric circuit including an instantaneous trip coil, a current coil adapted to energize said trip coil from the circuit to be protected, and a shunt including an electric motor having a stationary winding disposed across said current coil normally diverting current from said trip coil, said motor adapted to rotate and increase the inductance of said winding upon overload whereby more current will pass through and eventually operate said trip coil.

3. An overload protective device for an electric circuit comprising a trip coil, means to govern the operation of said trip coil including a motor having a winding connected in the circuit with said trip coil and arranged to admit energy to said trip coil in a manner determined by the speed thereof, a loading device driven by the rotor of said motor, and means to vary the effect of said loading device on the motor whereby to vary the acceleration thereof.

4. An overload protective device for an electric circuit including a current coil adapted to be energized by the current in the circuit to be protected, an instantaneous tripping relay energized by said current coil arranged to operate upon overload of a predetermined value, and means to delay the operation of said tripping relay in inverse proportion to the value of overload, said means including a normally inactive induction motor having a stator winding shunted across the terminals of said current coil.

5. An overload protective device for an electric circuit including a trip coil adapted to operate instantaneously upon the passage of a predetermined current therethrough, a source of energy for said trip coil responsive to the current conditions in the circuit, a current diverting shunt disposed across said trip coil, and electro-motive means having an energizing winding connected in said shunt circuit operable to increase the resistance to the flow of current therethrough in proportion to the value of overload in the circuit to be protected, said means having loading means operative to vary the acceleration thereof, and means to vary the effect of said loading means on said electro-motive means whereby to vary the time required before the predetermined current passes through said trip coil.

6. An overload protective device for an electric circuit including an instantaneous trip coil, means governed by the current flowing in said circuit to energize said trip coil, an inductive current-diverting shunt connected across said energizing means normally preventing the operation of said trip coil, and means associated with said shunt to vary the inductance thereof upon overload in said circuit and increase the impedance of said shunt to the passage of current therethrough.

7. An overload protective device for an electric circuit including an instantaneous trip coil, means governed by the current flowing in said circuit to energize said trip coil, inductive current-diverting means shunted across said energizing means normally preventing the operation of said trip coil, and an electro-motive element associated with said shunt adapted to rotate by the alternating flux set up by said inductive current-diverting means and increase the inductance of said shunt and thereby increase the current in said trip coil.

8. An overload protective device for an electric circuit characterized by an inverse time-delayed operation including an instantaneous trip coil, a source of energy for said coil responsive to the current flowing in the circuit, a normally inactive electro-motive device shunted across said trip coil adapted to be set in motion upon overload in the circuit to be protected to generate a counterelectromotive force in the shunt circuit, loading means acting on said electro-motive device, to vary the acceleration thereof, and means to vary the effect of said loading means on said device whereby the time interval of delay of said protective device may be varied.

9. An overload protective device for an electric circuit including an instantaneous trip coil, a source of energy for said trip coil adapted to vary with the current in the circuit to be controlled, and means to govern the operation of said trip coil including an induction motor having its stator winding shunted across the circuit of said trip coil and arranged to admit energy to said trip coil in a manner determined by the speed of rotation of the rotor thereof.

10. An overload protective device for an electric circuit including a relay having a winding connected to be energized from the circuit, an inductive winding shunted across said relay winding, and movable means actuated by the current in said inductive winding to change the inductance thereof and thereby to change the effect of said winding on said relay winding.

11. An overload protective device for an electric circuit including a relay having a winding connected to be energized from the circuit, an inductive winding shunted across said relay winding, and movable means to vary the inductance of said winding whereby to vary the effect of said winding on said relay winding.

12. An overload protective device for an electric circuit including a relay having a winding connected to be energized from the circuit, an inductive winding shunted across said relay winding, and an armature movable by said inductive winding to vary the inductance thereof whereby to vary the effect of said winding on said relay winding.

In testimony whereof, I have signed my name to this specification.

JOSEPH D. WOOD.